(12) United States Patent
Kim

(10) Patent No.: US 8,764,267 B2
(45) Date of Patent: Jul. 1, 2014

(54) EDGE TYPE BACKLIGHT UNIT AND METHOD FOR MANUFACTURING THE SAME

(75) Inventor: Miok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 248 days.

(21) Appl. No.: 13/182,094

(22) Filed: Jul. 13, 2011

(65) Prior Publication Data

US 2012/0014135 A1   Jan. 19, 2012

(30) Foreign Application Priority Data

Jul. 14, 2010   (KR) .................... 10-2010-0067941

(51) Int. Cl.
*F21V 7/04*   (2006.01)

(52) U.S. Cl.
USPC ............................. 362/623; 362/612; 362/613

(58) Field of Classification Search
USPC .......................... 362/612, 613, 623
See application file for complete search history.

(56) References Cited

U.S. PATENT DOCUMENTS

| 7,600,910 | B2 * | 10/2009 | Sakai ............................. 362/634 |
| 2004/0062057 | A1 * | 4/2004 | Ha et al. ........................ 362/561 |
| 2007/0279944 | A1 | 12/2007 | Sakai | |
| 2009/0015736 | A1 * | 1/2009 | Weller et al. .................... 349/11 |
| 2010/0085502 | A1 * | 4/2010 | Yen et al. ........................ 349/58 |
| 2011/0007238 | A1 * | 1/2011 | Kim .................................. 349/61 |

FOREIGN PATENT DOCUMENTS

CN    2678140 Y    2/2005
CN    101660724    3/2010

OTHER PUBLICATIONS

"The Characters of Thermal Interface Materials and Its Application"; Bangchao, et al.; Microelectronic and Solid Electronic College, UESTC, Chengdu, 610054.

* cited by examiner

*Primary Examiner* — Evan Dzierzynski
(74) *Attorney, Agent, or Firm* — McKenna Long & Aldridge LLP

(57) ABSTRACT

An edge type backlight unit and a method for manufacturing the same are disclosed. The edge type backlight unit includes light sources for providing light, a printed circuit board (PCB) on which the light sources are mounted, a metal bracket that contacts the printed circuit board and dissipates heat of the printed circuit board, and a thermal hardener formed between the printed circuit board and the metal bracket. The printed circuit board supplies an electrical signal for driving the light sources to the light sources.

10 Claims, 11 Drawing Sheets

EDGE TYPE BACKLIGHT UNIT AND METHOD FOR MANUFACTURING THE SAME

This application claims the benefit of Korean Patent Application No. 10-2010-0067941 filed on Jul. 14, 2010, the entire contents of which is incorporated herein by reference for all purposes as if fully set forth herein.

BACKGROUND OF THE INVENTION

1. Field of the Invention

Embodiments of the invention relate to an edge type backlight unit and a method for manufacturing the same.

2. Discussion of the Related Art

A range of application for liquid crystal displays has gradually widened because of its excellent characteristics such as light weight, thin profile, and low power consumption. The liquid crystal displays have been widely used in personal computers such as notebook PCs, office automation equipments, audio/video equipments, interior/outdoor advertising display devices, and the like. The liquid crystal display controls an electric field applied to a liquid crystal layer and modulates light coming from a backlight unit, thereby displaying an image.

The liquid crystal display includes a liquid crystal display panel displaying video data and a backlight unit providing light to the liquid crystal display panel. The liquid crystal display panel and the backlight unit are assembled in a stack to form a liquid crystal module. The liquid crystal module further includes a guide member and a case member for fixing the liquid crystal display panel and the backlight unit, and a driving circuit board of the liquid crystal display panel. A panel gap and a backlight unit cavity exist in the liquid crystal module. The panel gap corresponds to a space between the liquid crystal display panel and the backlight unit, and the backlight unit cavity is formed inside the backlight unit to receive a lamp.

The backlight unit is mainly classified into a direct type backlight unit and an edge type backlight unit. The direct type backlight unit has a structure in which a plurality of light sources are disposed under the liquid crystal display panel.

FIG. 1 is a cross-sectional view of a liquid crystal module including an edge type backlight unit using a thermal interface material (TIM). In the edge type backlight unit shown in FIG. 1, a light source 1 is positioned opposite the side of a light guide plate 4, and a plurality of optical sheets 6 are positioned between a liquid crystal display panel 10 and the light guide plate 4. Further, the light source 1 provides light to one side of the light guide plate 4, and the light guide plate 4 converts a line light source or a point light source into a surface light source. Hence, the light is diffused into the entire surface of the liquid crystal display panel 10.

A light emitting diode (LED) having advantages of high efficiency, high luminance, low power consumption, etc. has been recently spotlighted as the light source of the backlight unit. However, the efficiency and the lifespan of the LED are reduced as a temperature of the LED increases. Thus, various heat dissipation designs have been applied to the LED.

As shown in FIG. 1, a metal printed circuit board (PCB) 2 and a cover bottom 7 are attached to each other using a thermal interface material 3. When a complete surface contact between the metal PCB 2 and the thermal interface material 3 is achieved, heat dissipation characteristic of the backlight unit may increase. However, because a process for applying the thermal interface material 3 is manually performed, the uniformity of the application processing is reduced. Hence, a gap is generated between the metal PCB 2 and the cover bottom 7.

FIG. 2 is a plane view of the metal PCB 2 fastened to the cover bottom 7 using a screw 11. As shown in FIG. 2, when the metal PCB 2 is fastened to the cover bottom 7 using the screw 11, a surface contact between a fastening portion 'a' of the screw 11 and a non-fastening portion 'b' of the screw 11 is not uniform.

In other words, the surface contact between the metal PCB 2 and the thermal interface material 3 is not uniform in the process for attaching the metal PCB 2 to the cover bottom 7 using the thermal interface material 3. Further, the surface contact between the metal PCB 2 and the cover bottom 7 is not uniform in the process for fastening the metal PCB 2 to the cover bottom 7 using the screw 11. Thus, all of the two methods are not sufficient to efficiently dissipate heat.

SUMMARY OF THE INVENTION

In one aspect, there is an edge type backlight unit comprising light sources configured to provide light, a printed circuit board (PCB) on which the light sources are mounted configured to supply an electrical signal for driving the light sources to the light sources, a metal bracket configured to contact the printed circuit board and dissipate heat of the printed circuit board, and a thermal hardener formed between the printed circuit board and the metal bracket.

In another aspect, there is a method for manufacturing an edge type backlight unit comprising standing a metal bracket and fixing the metal bracket to a jig, coating an coating area of the metal bracket with a thermal hardener of a liquid state, safely receiving a printed circuit board, on which light sources are mounted, on the thermal hardener, applying heat to the thermal hardener and the printed circuit board to attach the thermal hardener to the printed circuit board, and separating the metal bracket from the jig to attach the metal bracket to a cover bottom.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
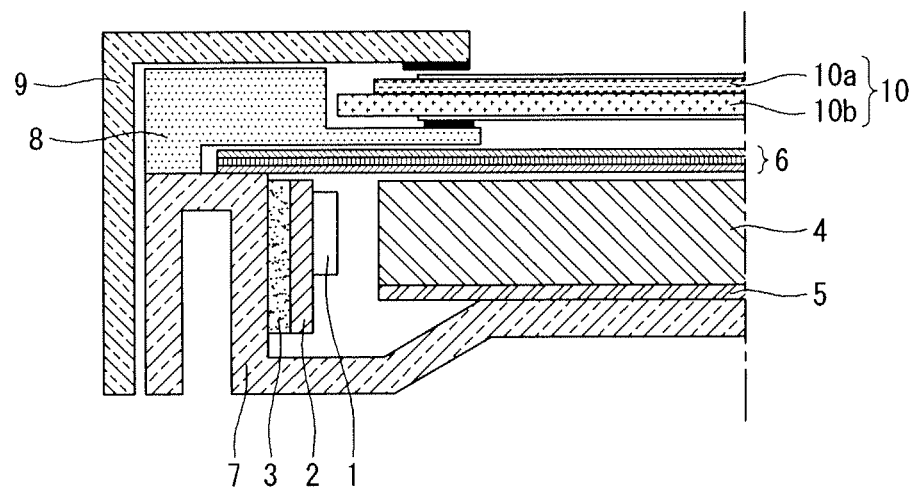
FIG. 1 is a cross-sectional view of a liquid crystal module including an edge type backlight unit using a thermal interface material.
Figure 2:
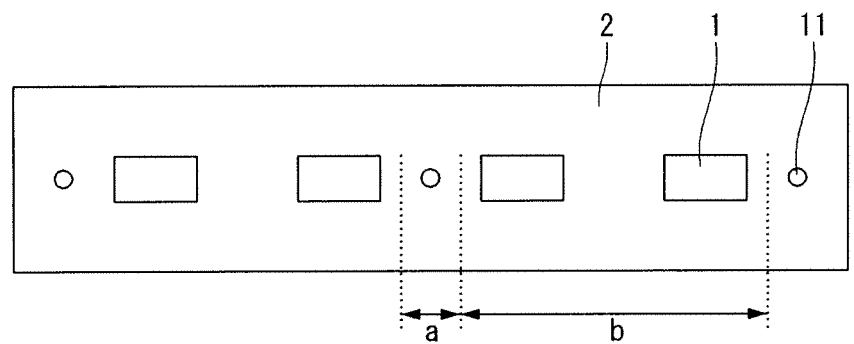
FIG. 2 is a plane view of a metal printed circuit board (PCB) fastened to a cover bottom using a screw.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 3:
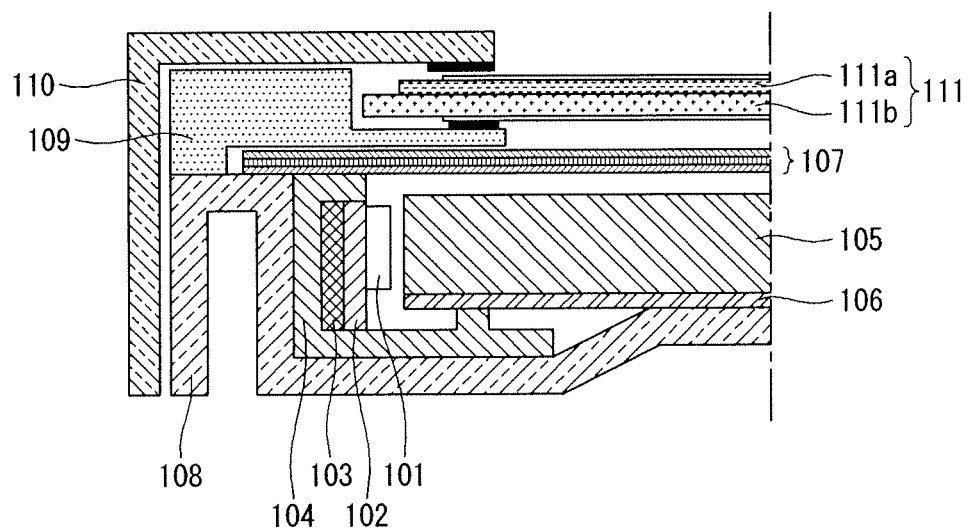
FIG. 3 is a cross-sectional view of a liquid crystal module including an edge type backlight unit according to an example embodiment of the invention.

FIG. 3 is a cross-sectional view of a liquid crystal module including an edge type backlight unit according to an example embodiment of the invention. As shown in FIG. 3, a liquid crystal module according to an example embodiment of the invention includes a display panel 111, a driving circuit board (not shown) of the display panel 111, a backlight unit, a guide member and a case member supporting the backlight unit. The guide member and the case member include a guide panel 109, a case top 110, a cover bottom 108, and the like.

The display panel 111 includes an upper glass substrate 111a, a lower glass substrate 111b, and a liquid crystal layer between the upper and lower glass substrates 111a and 111b. A plurality of data lines and a plurality of gate lines are formed on the lower glass substrate 111b of the display panel 111 to cross each other. The display panel 111 includes a plurality of liquid crystal cells arranged in a matrix form based on a crossing structure of the data lines and the gate lines. Further, thin film transistors (TFTs), pixel electrodes of the liquid crystal cells connected to the TFTs, storage capacitors, etc. are formed on the lower glass substrate 111b of the display panel 111. The liquid crystal cells are driven by an electric field generated by a voltage difference between a data voltage supplied to the pixel electrodes through the data lines and a common voltage supplied to common electrodes, and adjusts amount of light transmitted by the display panel 111.

Black matrixes, color filters, the common electrodes, etc, are formed on the upper glass substrate 111a of the display panel 111. The common electrodes are formed on the upper glass substrate 111a in a vertical electric field driving manner such as a twisted nematic (TN) mode and a vertical alignment (VA) mode. In a horizontal electric field driving manner such as an in-plane switching (IPS) mode and a fringe field switching (FFS) mode, the common electrodes are formed on the lower glass substrate 111b along with the pixel electrodes. Polarizing plates are respectively attached to the upper glass substrate 111a and the lower glass substrate 111b. Alignment layers for setting a pre-tilt angle of liquid crystals in the inside surface contacting the liquid crystals are respectively formed on the upper glass substrate 111a and the lower glass substrate 111b.

The driving circuit board (not shown) of the display panel 111 includes a gate driver, a data driver, and a timing controller. The data driver includes a plurality of data driver integrated circuits (ICs). Each of the plurality of data driver ICs includes a shift register for sampling clocks, a register for temporarily storing digital video data RGB, a latch which stores data corresponding to one line in response to the clocks received from the shift register and simultaneously outputs the data each corresponding to the one line, a digital-to-analog converter (DAC) for selecting positive and negative gamma voltages based on a gamma reference voltage corresponding to the digital data received from the latch, a multiplexer for selecting the data line receiving analog data converted from the positive and negative gamma voltages, an output buffer connected between the multiplexer and the data lines, and the like. The data driver latches the digital video data RGB under the control of the timing controller and converts the latched digital video data RGB into positive and negative analog data voltages using positive and negative gamma compensation voltages. The data driver then supplies the positive and negative analog data voltages to the data lines.

The gate driver includes a plurality of gate driver ICs. Each of the plurality of gate driver ICs includes a shift register, a level shifter for converting an output signal of the shift register into a signal having a swing width suitable for a TFT drive of the liquid crystal cells, an output buffer, and the like. The gate driver sequentially outputs a gate pulse (or a scan pulse) having a width of about one horizontal period under the control of the timing controller and supplies the gate pulse to the gate lines.

The timing controller receives the digital video data RGB and timing signals Vsync, Hsync, DE, and DCLK from a system board mounted with an external video source and supplies the digital video data RGB to the data driver. The timing signals Vsync, Hsync, DE, and DCLK includes a vertical sync signal Vsync, a horizontal sync signal Hsync, a data enable DE, and a dot clock DCLK. The timing controller generates a data control signal and a gate control signal for respectively controlling operation timing of the data driver and operation timing of the gate driver based on the timing signals Vsync, Hsync, DE, and DCLK. The timing controller inserts an interpolation frame between frames of an image signal input at a frame frequency of 60 Hz. The timing controller multiplies the frequency of the data control signal by the frequency of the gate control signal and may control operations of the data driver and the gate driver using the frame frequency of (60×N) Hz, where N is a positive integer equal to or greater than 2.

The edge type backlight unit includes a light source 101, a metal printed circuit board (PCB) 102, a thermal hardener 103, a metal bracket 104, a light guide plate 105, a reflector sheet 106, a plurality of optical sheets 107, and the like.

The edge type backlight unit converts light from the light source 101 into a uniform surface light source through the light guide plate 105 and the optical sheets 107 and provides light to the display panel 111. The light source 101 is positioned to at least one side of the light guide plate 105 and provides light to the at least one side of the light guide plate 105. The reflector sheet 106 disposed under the light guide plate 105 reflects light, which travels downward from the light guide plate 105, to the light guide plate 105. The optical sheets 107 include at least one prism sheet and at least one diffusion sheet. Hence, the optical sheets 107 diffuse light incident from the light guide plate 105 and refract a travel path of light at substantially vertical angle to a light incident surface of the display panel 111. The optical sheets 107 may further include a dual brightness enhancement film (DBEF).

The light source 101 includes point light sources such as a light emitting diode (LED). The light source 101 receives an electrical signal from a light source driver (not shown) through the metal PCB 102, and thus turns on or off. A circuit for electrically connecting the light source 101 to the light source driver is mounted on the metal PCB 102. The metal PCB 102 may be manufactured using aluminum advantageous to the heat dissipation.

The thermal hardener 103 is coated on the metal bracket 104 and dissipates heat generated in the light source 101 and the metal PCB 102. The thermal hardener 103 contains a thermosetting polymer material as the main component. Examples of the thermosetting polymer material include a heat transfer material capable of increasing a heat transfer rate. For example, the thermosetting polymer material contains a proper amount of at least one of aluminum oxide ($Al_2O_3$), boron nitride (BN), aluminum nitride (AlN), beryllium oxide (BeO), silicon nitride ($Si_3N_4$), barium oxide (BaO), sapphire, and liquid crystal polymer (LCP).

The thermal hardener 103 is evenly coated on the metal bracket 104 so as to improve a heat dissipation effect. After the thermal hardener 103 is evenly coated, the metal PCB 102 is safely received on the thermal hardener 103. The coating of the thermal hardener 103 is described in detail later with reference to FIGS. 7A to 7C. Further, the heat dissipation effect of the thermal hardener 103 is described in detail later with reference to FIG. 8.

The metal bracket 104 is formed to warp a lower part and the side of the metal PCB 102. The metal bracket 104 includes a material having a high heat transfer rate, so as to smoothly dissipate heat generated in the light source 101 and the metal PCB 102 to the outside. Thus, the metal bracket 104 may be manufactured as an aluminum-based metal plate such as aluminum and aluminum nitride (AlN). A high conductive material may be coated on the aluminum-based metal plate, so as to accelerate a heat transfer. Alternatively, the metal bracket 104 may be manufactured using copper. The shape of the metal bracket 104 is described in detail later with reference to FIGS. 4A to 4C and FIGS. 5A and 5B.

The guide panel 109 may be manufactured using a rectangular frame obtained by mixing a glass fiber with a synthetic resin such as polycarbonate. Or the guide panel 109 may be manufactured using plastic, or steel use stainless (SUS). The guide panel 109 warps an edge of an upper surface of the display panel 111, the side of the display panel 111, and the side of the backlight unit. The guide panel 109 positioned under the display panel 111 supports the display panel 111 and keeps a distance between the display panel 111 and the optical sheets 107 constant.

The case top 110 is manufactured using electrolytic galvanized iron (EGI), steel use stainless (SUS), etc. The case top 110 has a structure for warping an upper surface and the side of the guide panel 109. The case top 110 is fixed to at least one of the guide panel 109 and the cover bottom 108 using a hook or a screw.

The cover bottom 108 is manufactured as a rectangular metal frame and wraps the side and the bottom surface of the backlight unit. The cover bottom 108 is manufactured using high strength steel. For example, the cover bottom 108 may be manufactured using electrolytic galvanized iron (EGI), steel use stainless (SUS), galvalume steel coil (SGLC), aluminum coated steel (ALCOSTA), and steel plated tin (SPTE).

Figure 4A:
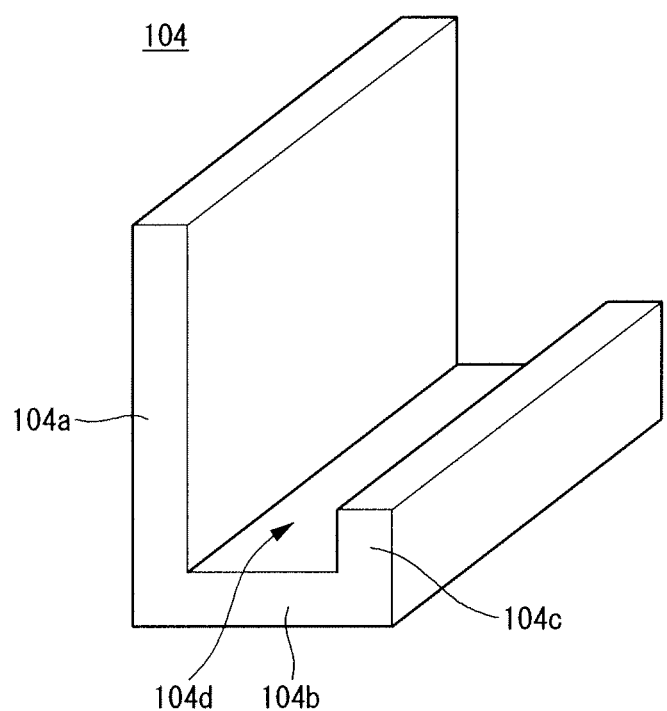
FIGS. 4A to 4C are perspective views illustrating various configurations of a metal bracket according to an example embodiment of the invention.
Figure 4B:
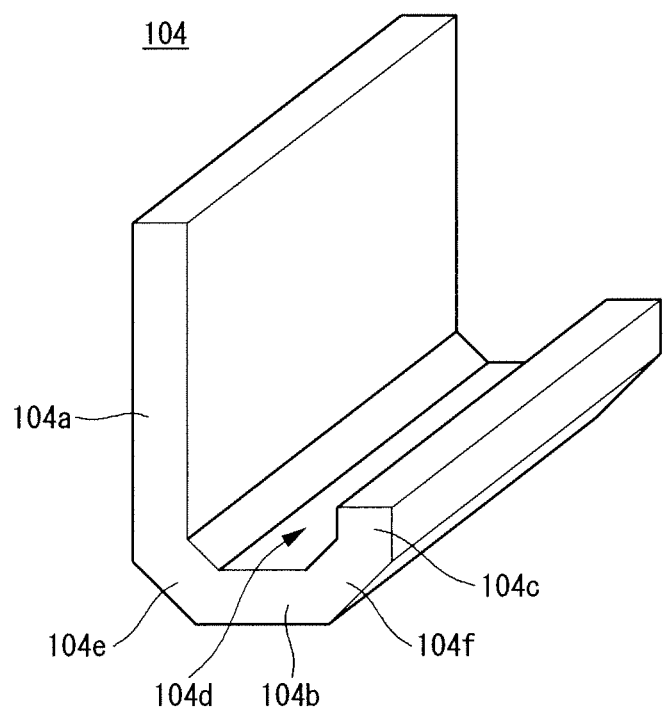
Figure 4C:
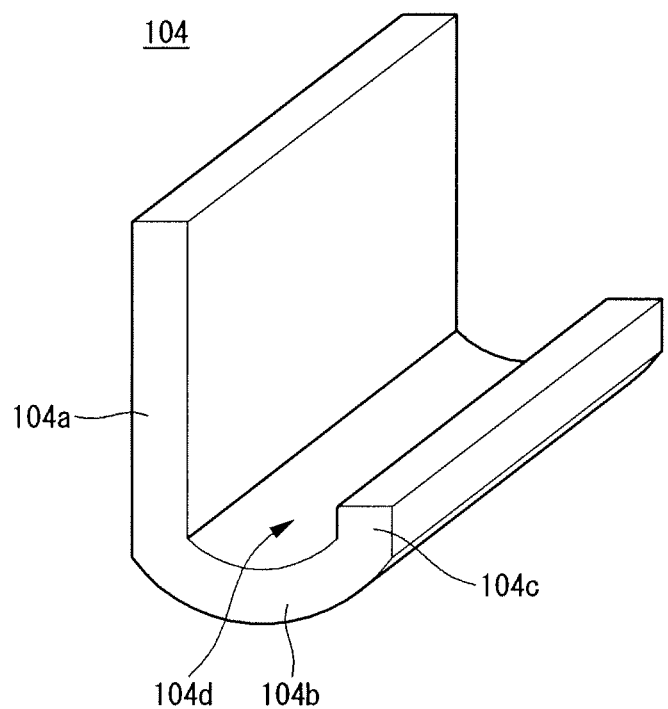

FIGS. 4A to 4C are perspective views illustrating various configurations of the metal bracket 104 according to the example embodiment of the invention.

As shown in FIG. 4A, a sidewall 104b of the metal bracket 104 is vertically bent from one end of a main body 104a of the metal bracket 104. A dam 104c of the metal bracket 104 is vertically bent from one end of the sidewall 104b and is parallel to the main body 104a. A length of the sidewall 104b is shorter than a length of the main body 104a. A coating area 104d formed by the main body 104a, the sidewall 104b, and the dam 104c is an area to be coated with the thermal hardener 103.

Alternatively, as shown in FIG. 4B, a first corner 104e is bent from one end of the main body 104a at an inclined angle, which is greater than 0° and less than 90°. The sidewall 104b is bent from one end of the first corner 104e at the inclined angle and is vertical to the main body 104a. A second corner 104f is bent from the sidewall 104b at the inclined angle. The dam 104c is bent from the second corner 104f at the inclined angle and is parallel to the main body 104a. A length of the sidewall 104b is shorter than a length of the main body 104a. A coating area 104d formed by the main body 104a, the sidewall 104b, the dam 104c, the first corner 104e, and second corner 104f is an area to be coated with the thermal hardener 103.

Alternatively, as shown in FIG. 4C, the sidewall 104b is curved from the main body 104a. The dam 104c is curved from an end of the sidewall 104b and is parallel to the main body 104a. A length of the sidewall 104b is shorter than a length of the main body 104a. A coating area 104d formed by the main body 104a, the sidewall 104b, and the dam 104c is an area to be coated with the thermal hardener 103.

In the metal bracket 104 illustrated in FIGS. 4A to 4C, the length of the dam 104c may made shorter than the length of the main body 104a. An increase in a thickness of the dam 104c may further help the heat dissipation. In addition to the configurations of the metal bracket 104 illustrated in FIGS. 4A to 4C, other configurations may be used for the metal bracket 104.

Figure 5A:
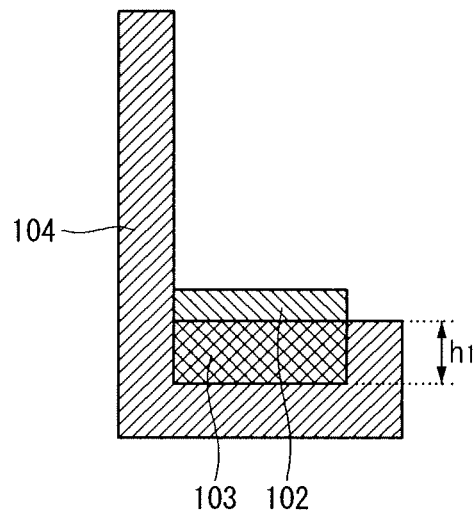
FIGS. 5A and 5B are cross-sectional views of a metal bracket coated with a thermal hardener according to an example embodiment of the invention.
Figure 5B:
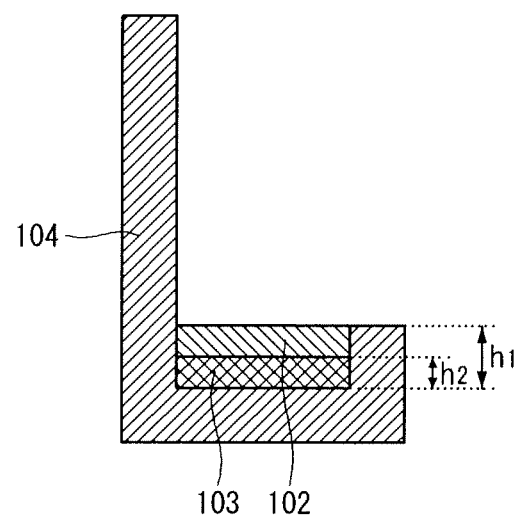

In the following description, the backlight unit according to the embodiment of the invention is described using the metal bracket 104 illustrated in FIG. 4A as an example. FIGS. 5A and 5B are cross-sectional views of the metal bracket 104 coated with the thermal hardener 103 according to the embodiment of the invention.

As shown in FIG. 5A, the thermal hardener 103 is coated on the coating area 104d up to a height h1 of the dam 104c. The metal PCB 102 is attached to the coated thermal hardener 103, one side of the metal PCB 102 contacts the main body 104a of the metal bracket 104, and the bottom surface of the metal PCB 102 contacts the thermal hardener 103.

Alternatively, as shown in FIG. 5B, the thermal hardener 103 is coated on the coating area 104d up to a height h2 less than the height h1 of the dam 104c. The coating height h2 of the thermal hardener 103 may be set to be greater than 0 and less than the height h1 of the dam 104c. The metal PCB 102 is attached to the coated thermal hardener 103, both sides of the metal PCB 102 contact the main body 104a and the dam 104c of the metal bracket 104, and the bottom surface of the metal PCB 102 contacts the thermal hardener 103.

Figure 6:
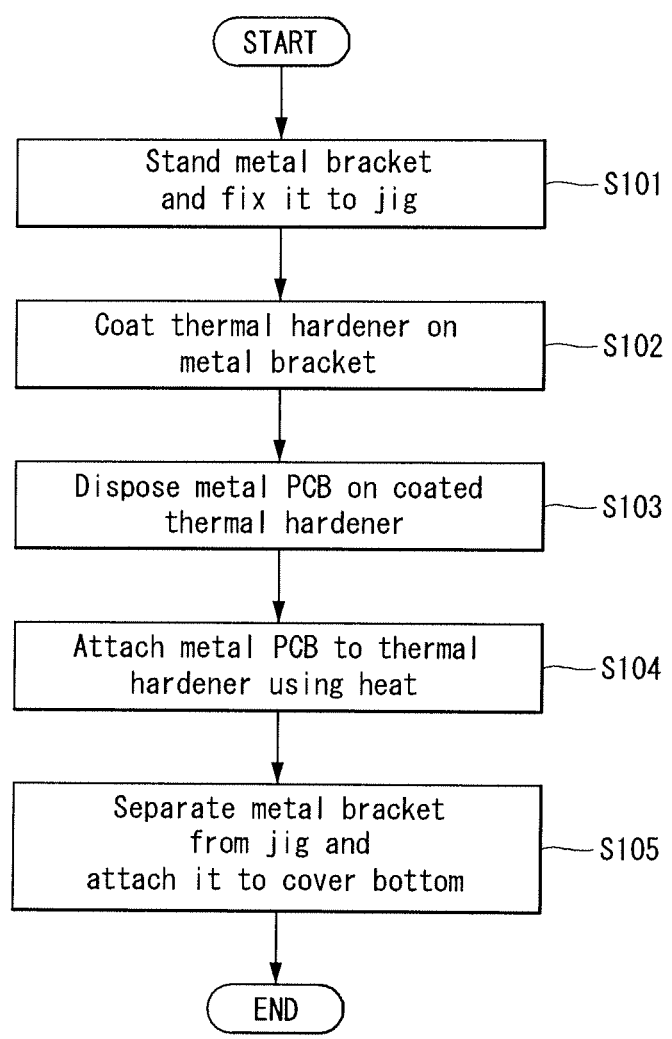
FIG. 6 is a flow chart illustrating a method for manufacturing an edge type backlight unit according to an example embodiment of the invention.
Figure 7A:
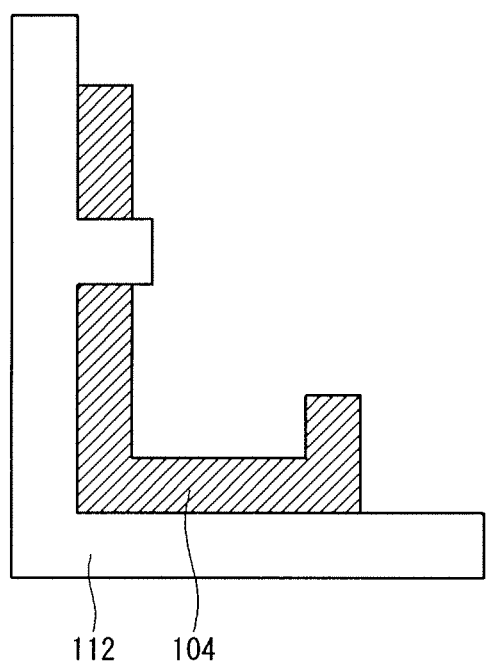
FIGS. 7A to 7C are cross-sectional views illustrating a method for manufacturing an edge type backlight unit according to an example embodiment of the invention.
Figure 7B:
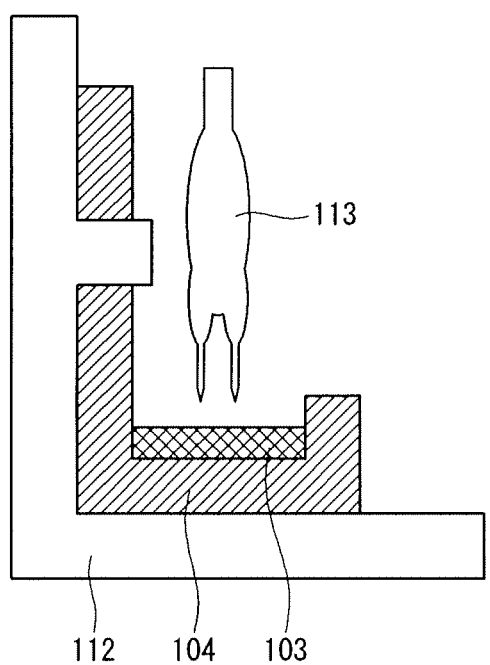
Figure 7C:
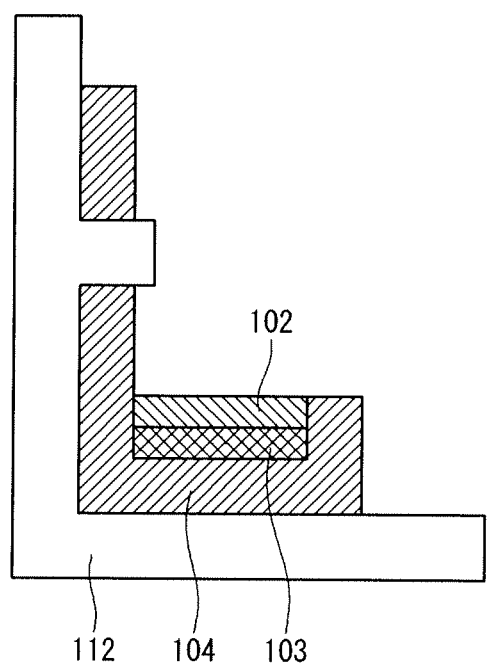

FIG. 6 is a flow chart illustrating a method for manufacturing the edge type backlight unit according to the embodiment of the invention. FIGS. 7A to 7C are cross-sectional views illustrating a method for manufacturing the edge type backlight unit according to the embodiment of the invention.

The method for manufacturing the edge type backlight unit according to the embodiment of the invention includes coating the thermal hardener 103 on the metal bracket 104 and attaching the metal PCB 102 to the coated thermal hardener 103. For this, as shown in FIGS. 6 and 7A to 7C, the metal bracket 104 is stood and is fixed to a jig 112 in step S101. More specifically, the metal bracket 104 is stood and is fixed to the jig 112, so as to easily coat the thermal hardener 103 of a liquid state on the coating area 104d formed by the main body 104a, the sidewall 104b, and the dam 104c of the metal bracket 104.

After the metal bracket 104 is fixed to the jig 112, the liquid thermal hardener 103 is coated on the coating area 104d using a dispenser 113 in step S102. More specifically, the thermal hardener 103 is coated on the coating area 104d of the metal bracket 104 up to a previously determined coating height using the dispenser 113. The configurations of the metal bracket 104 and the configurations of the coating area 104d were described with reference to FIGS. 4A to 4C and FIGS. 5A and 5B.

After the liquid thermal hardener 103 is coated on the metal bracket 104, the metal PCB 102 is safely received on the liquid thermal hardener 103 in step S103. Next, heat is applied to the metal PCB 102 and the thermal hardener 103 to attach the metal PCB 102 to the thermal hardener 103 in step S104. Because the metal PCB 102 and the thermal hardener 103, that are attached to each other, form the uniform surface contact, the heat dissipation characteristic is greatly improved. The heat dissipation effect of the thermal hardener 103 manufactured using the method according to the embodiment of the invention is described later with reference to FIG. 8, After the metal PCB 102 is attached to the thermal hardener 103, the metal bracket 104 is separated from the jig 112. The separated metal bracket 104 is attached to the cover bottom 108 in step S105. Next, the cover bottom 108, the light guide plate 105, the reflector sheet 106, and the optical sheets 107 are assembled with one another to complete the edge type backlight unit according to the embodiment of the invention.

Figure 8:
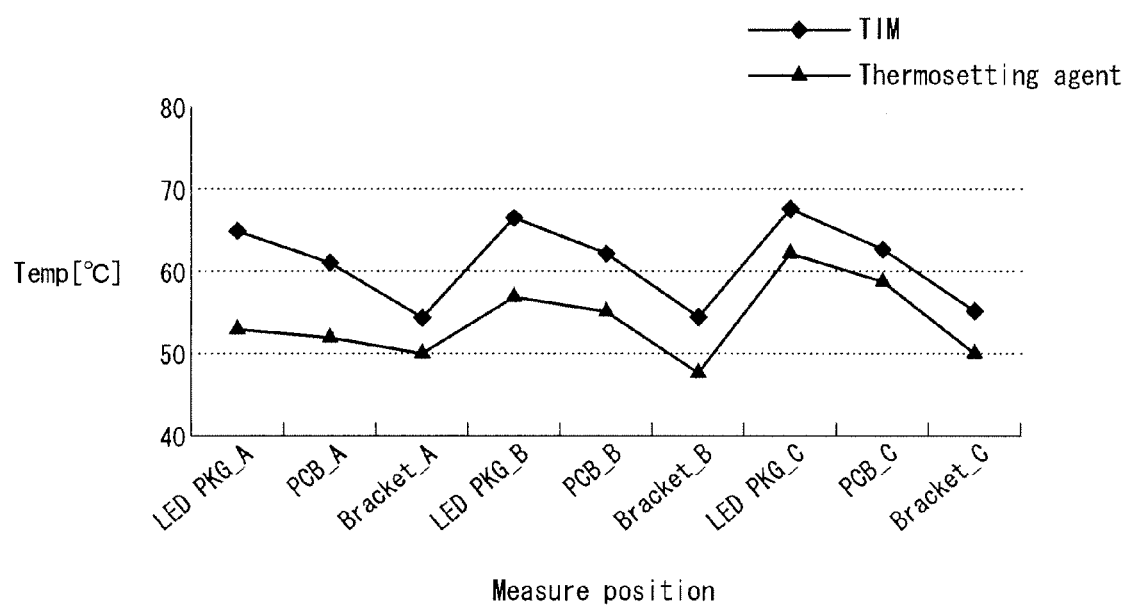
FIG. 8 is a graph comparing a temperature of an edge type backlight unit using a thermal interface material with a temperature of an edge type backlight unit using a thermal hardener.

FIG. 8 is a graph comparing a temperature of an edge type backlight unit using the thermal interface material (TIM) with a temperature of an edge type backlight unit using the thermal hardener. More specifically, FIG. 8 illustrates temperatures of a light source, a metal PCB, and a metal bracket of each of the edge type backlight unit using the TIM and the edge type backlight unit using the thermal hardener. The temperature of each of the light source, the metal PCB, and the metal bracket was measured at three positions.

In the edge type backlight unit using the TIM, the light source was about 65° C. at its first position LED PKG_A, about 67° C. at its second position LED PKG_B, and about 68° C. at its third position LED PKG_C. The metal PCB was about 61° C. at its first position PCB_A, about 62° C. at its second position PCB_B, and about 63° C. at its third position PCB_C. The metal bracket was about 55° C. at its first position Bracket_A, about 55° C. at its second position Bracket_B, and about 55° C. at its third position Bracket_C.

In the edge type backlight unit using the thermal hardener, the light source was about 52° C. at the first position LED PKG_A, about 57° C. at the second position LED PKG_B, and about 61° C. at the third position LED PKG_C. The metal PCB was about 51° C. at the first position PCB_A, about 54° C. at the second position PCB_B, and about 59° C. at the third position PCB_C. The metal bracket was about 50° C. at the first position Bracket_A, about 48° C. at the second position Bracket_B, and about 50° C. at the third position Bracket_C.

In the edge type backlight unit using the TIM, an average temperature of the light source was about 66.2° C., an average temperature of the metal PCB was about 61.8° C., and an average temperature of the metal bracket was about 54.7° C. In the edge type backlight unit using the thermal hardener, an average temperature of the light source was about 57.2° C., an average temperature of the metal PCB was about 55.2° C., and an average temperature of the metal bracket was about 49.2° C. Thus, the average temperatures of the light source, the metal PCB, and the metal bracket in the edge type backlight unit using the thermal hardener were lower than the edge type backlight unit using the TIM, by about 8.97° C., 6.57° C., and 5.43° C., respectively. Namely, the edge type backlight unit using the thermal hardener had more excellent heat dissipation effect than the edge type backlight unit using the TIM.

As described above, the edge type backlight unit according to the example embodiment of the invention is manufactured by evenly coating the thermal hardener on the metal bracket and attaching the metal PCB to the coated thermal hardener. As a result, the metal PCB and the thermal hardener form the uniform surface contact, thereby efficiently dissipate the heat. Further, both sides of the metal PCB contact the metal bracket having the excellent heat dissipation characteristic. As a result, the edge type backlight unit according to the example embodiment of the invention may more efficiently dissipate the heat of the metal PCB. Further, the edge type backlight unit according to the example embodiment of the invention may prevent the degradation of the light source to increase life span of the light source and also may prevent the light guide plate and the optical sheets from being deformed by heat.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An edge type backlight unit comprising:
   light sources configured to provide light;
   a printed circuit board (PCB) on which the light sources are mounted and, configured to supply an electrical signal for driving the light sources to the light sources;
   a metal bracket configured to contact the printed circuit board;
   a thermal hardener formed between the printed circuit board and the metal bracket; and
   a cover bottom configured to contact a side and bottom surfaces of the metal bracket,
   wherein both sides of the printed circuit board contact the metal bracket, and a bottom surface of the printed circuit board contacts the thermal hardener.

2. The edge type backlight unit of claim 1, further comprising:
   a light guide plate configured to convert light from the light sources into a surface light source and uniformly emit the light to a display surface of a display panel;
   a reflector sheet disposed under the light guide plate; and
   at least one optical sheet disposed between the light guide plate and the display panel,
   wherein the cover bottom covers sides and bottom surfaces of the metal bracket, the light guide plate, and the reflector sheet.

3. The edge type backlight unit of claim 2, wherein the metal bracket includes a main body horizontally disposed on the cover bottom, a sidewall vertically bent from one end of the main body, and a dam which is vertically bent from the sidewall and is formed in a direction parallel to the main body,
   wherein an area coated with the thermal hardener is provided in a space between the main body, the sidewall, and the dam.

4. The edge type backlight unit of claim 3, wherein a length of the dam is shorter than a length of the main body.

5. The edge type backlight unit of claim 2, wherein the metal bracket includes a main body horizontally disposed on the cover bottom, a first corner, which is bent from one end of the main body at an inclined angle, which is greater than 0° and less than 90°, a sidewall, which is bent from the first corner at the inclined angle and is vertical to the main body, a second corner bent from the sidewall at the inclined angle, and a dam which is bent from the second corner at the inclined angle and is formed in a direction parallel to the main body, wherein an area coated with the thermal hardener is provided in a space between the main body, the first corner, the sidewall, the second corner, and the dam.

6. The edge type backlight unit of claim 5, wherein a length of the dam is shorter than a length of the main body.

7. The edge type backlight unit of claim 2, wherein the metal bracket includes a main body horizontally disposed on the cover bottom, a sidewall, which is curved from one end of the main body, and a dam which is curved from the sidewall and is formed in a direction parallel to the main body, wherein an area coated with the thermal hardener is provided in a space between the main body, the sidewall, and the dam.

8. The edge type backlight unit of claim 7, wherein a length of the dam is shorter than a length of the main body.

9. A method for manufacturing an edge type backlight unit comprising:

standing a metal bracket and fixing the metal bracket to a jig;

coating an coating area of the metal bracket with a thermal hardener of a liquid state;

receiving a printed circuit board, on which light sources are mounted, on the thermal hardener;

applying heat to the thermal hardener and the printed circuit board to attach the thermal hardener to the printed circuit board; and separating the metal bracket from the jig to attach the metal bracket to a cover bottom, wherein the metal bracket contacts the printed circuit board, and wherein both sides of the printed circuit board contact the metal bracket, and a bottom surface of the printed circuit board contacts the thermal hardener.

10. The method of claim 9, wherein the coating of the coating area of the metal bracket includes coating the coating area of the metal bracket with the thermal hardener of the liquid state using a dispenser.

* * * * *